(12) United States Patent
Imai

(10) Patent No.: US 10,802,383 B2
(45) Date of Patent: Oct. 13, 2020

(54) PROJECTOR AND METHOD FOR CONTROLLING PROJECTOR

(71) Applicant: SEIKO EPSON CORPORATION, Tokyo (JP)

(72) Inventor: Shun Imai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/260,446

(22) Filed: Jan. 29, 2019

(65) Prior Publication Data

US 2019/0235371 A1 Aug. 1, 2019

(30) Foreign Application Priority Data

Jan. 30, 2018 (JP) .................................. 2018-013952

(51) Int. Cl.
| | |
|---|---|
| *G03B 21/20* | (2006.01) |
| *G06F 3/0484* | (2013.01) |
| *H04N 9/31* | (2006.01) |
| *G06T 5/00* | (2006.01) |
| *G09G 5/00* | (2006.01) |
| *H04N 7/01* | (2006.01) |

(52) U.S. Cl.
CPC ..... *G03B 21/2006* (2013.01); *G06F 3/04847* (2013.01); *G06T 5/006* (2013.01); *G09G 5/00* (2013.01); *H04N 7/0122* (2013.01); *H04N 9/3123* (2013.01); *H04N 9/3185* (2013.01); *H04N 9/3188* (2013.01)

(58) Field of Classification Search
CPC .. G03B 21/005; G03B 21/006; G03B 21/008; G03B 21/2006; H04N 9/3123; H04N 9/3185; H04N 9/3188
See application file for complete search history.

(56) References Cited

U.S. PATENT DOCUMENTS

| | | | |
|---|---|---|---|
| 2008/0068562 A1* | 3/2008 | Hirata .................... | H04N 5/232 353/25 |
| 2010/0128185 A1 | 5/2010 | Nakagawa et al. | |
| 2012/0032978 A1* | 2/2012 | Chae .................... | H04N 9/3147 345/644 |
| 2013/0314552 A1* | 11/2013 | Miaw .................. | G09G 3/2003 348/189 |

(Continued)

FOREIGN PATENT DOCUMENTS

| | | |
|---|---|---|
| JP | 2009-31407 A | 2/2009 |
| JP | 2013-239835 A | 11/2013 |

*Primary Examiner* — Sultan Chowdhury
(74) *Attorney, Agent, or Firm* — Oliff PLC

(57) ABSTRACT

A projector includes: an image interface unit; a projection unit which projects a projection image based on image information, onto a screen; a setting unit which sets an aspect ratio of the projection image; a projection control unit which causes the projection unit to project the projection image according to the aspect ratio set by the setting unit; and an EDID processing unit which causes first information about an aspect ratio of the image information to be transmitted to a PC. If the setting unit changes the aspect ratio of the projection image from a first aspect ratio to a second aspect ratio, the EDID processing unit causes the first information based on the second aspect ratio to be transmitted to the PC.

20 Claims, 8 Drawing Sheets

(56) References Cited

U.S. PATENT DOCUMENTS

| | | | |
|---|---|---|---|
| 2013/0328878 A1* | 12/2013 | Stahl | G06F 3/1431 345/428 |
| 2014/0285777 A1* | 9/2014 | Inoue | H04N 9/3188 353/70 |
| 2015/0237319 A1* | 8/2015 | Tsai | G03B 21/208 345/175 |
| 2016/0188274 A1* | 6/2016 | Chen | G06F 3/1423 345/2.1 |

* cited by examiner

| No. | PANEL RESOLUTION | DISPLAY MODE | SCREEN RESOLUTION | ASPECT RATIO |
|---|---|---|---|---|
| 1 | 1280 × 768 | WXGA | 1280 × 768 | 5:3 |
| 2 | 1280 × 768 | XGA | 1024 × 768 | 4:3 |
| 3 | 1280 × 768 | HD+(WXGA++) | 1600 × 900 | 16:9 |

PROJECTOR AND METHOD FOR CONTROLLING PROJECTOR

The entire disclosure of Japanese Patent Application No. 2018-013952, filed Jan. 30, 2018 is expressly incorporated by reference herein.

BACKGROUND

1. Technical Field

The present invention relates to a projector and a method for controlling a projector.

2. Related Art

According to the related art, an example of a projector projecting a projection image based on an externally inputted image and changing the aspect ratio of the projection image in response to an operation on a remote controller or an operation panel is known (see, for example, JP-A-2013-239835).

The projector disclosed in JP-A-2013-239835 can change the aspect ratio of a projection image projected on a screen. However, according to the related art, there is no example of changing the aspect ratio or resolution of an image inputted to a projector from an external device such as a personal computer or disc playback device, by an operation of the projector.

SUMMARY

An advantage of some aspects of the invention is that an aspect ratio or resolution of an image inputted to a projector from an external device is changed by a function or operation of the projector.

An aspect of the invention is directed to a projector including: a communication unit which communicates with an external device; a projection unit which projects, on a projection surface, a projection image based on image information transmitted to the projector from the external device via the communication unit; a setting unit which sets an aspect ratio of the projection image; a projection control unit which causes the projection unit to project the projection image according to the aspect ratio set by the setting unit; and a control unit which causes the communication unit to transmit, to the external device, first information about an aspect ratio of the image information transmitted from the external device. If the setting unit changes the aspect ratio of the projection image from a first aspect ratio to a second aspect ratio, the control unit causes the communication unit to transmit the first information based on the second aspect ratio, to the external device.

According to the aspect of the invention, the first information based on the aspect ratio of the projection image by the projector is transmitted to the external device. This configuration enables a function of the projector to change the aspect ratio or resolution of the image information received by the projector from the external device.

In the aspect of the invention, the first information may be information including the aspect ratio of the image information transmitted from the external device.

This configuration enables a function of the projector to designate the aspect ratio or resolution of the image information transmitted from the external device to the projector.

In the aspect of the invention, the projector may further include an operation unit which accepts an operation. The setting unit may set the aspect ratio of the projection image, based on an aspect ratio designated by an operation accepted by the operation unit.

This configuration enables transmission of image information corresponding to an aspect ratio or resolution set by a user's operation, to the projector from the external device.

In the aspect of the invention, the projector may further include a detection unit which detects an aspect ratio that fits the projection surface. The setting unit may set the aspect ratio of the projection image, based on a result of the detection by the detection unit.

This configuration enables the aspect ratio of the projection image to be set easily.

In the aspect of the invention, the detection unit may select an aspect ratio that fits the projection surface from among candidates of the aspect ratio of the projection image that can be projected by the projection unit. If the candidates of the aspect ratio do not include the aspect ratio that fits the projection surface, the detection unit may select an aspect ratio such that the projection image does not extend beyond the projection surface, from among the candidates of aspect ratio.

This configuration enables an aspect ratio of the projection image to be selected and set from among candidates even if the candidates do not include the aspect ratio that fits the projection surface.

In the aspect of the invention, the projector may further include an image pickup unit which picks up an image of the projection surface. The detection unit may select an aspect ratio that fits the projection surface, based on a picked-up image by the image pickup unit.

This configuration enables the aspect ratio of the projection image to be set easily, based on the picked-up image of the projection surface.

In the aspect of the invention, when the image pickup unit picks up an image of the projection surface, the projection unit may stop projecting the projection image based on the image information transmitted to the projector from the external device via the communication unit.

This configuration enables the shape, aspect ratio and the like of the projection surface to be detected properly.

In the aspect of the invention, the projection unit may have a light source, and a modulation unit which has an image forming unit for forming an image and which modulates light emitted from the light source, via an image formed by the image forming unit. When the image pickup unit picks up an image of the projection surface, the projection unit may project an image for detection with a screen resolution of the image forming unit.

This configuration enables accurate detection of the fitting state between the image forming unit of the projection unit and the projection surface.

In the aspect of the invention, the projector may further include an image processing unit which carries out geometric correction of the image formed by the image forming unit. When the image pickup unit picks up an image of the projection surface, the geometric correction by the image processing unit may be stopped.

This configuration enables more accurate detection of the fitting state between the image forming unit and the projection surface.

In the aspect of the invention, the first information may include a plurality of candidates of the aspect ratio of the image information, and information designating a level of priority of each of the candidates. The control unit may cause the communication unit to transmit the first information which include the second aspect ratio among the candidates and in which the level of priority of the second aspect ratio is higher than the levels of priority of the other aspect ratios.

This configuration enables the aspect ratio of the image information transmitted from the external device to be set as the aspect ratio that fits the projection image by the projector.

In the aspect of the invention, the first information may include a candidate of the aspect ratio of the image information. If the setting unit changes the aspect ratio of the projection image from the first aspect ratio to the second aspect ratio, the control unit may carry out processing on the first information to reduce the number of the candidate included in the first information and to include the second aspect ratio, and may cause the communication unit to transmit the first information after the processing.

This configuration enables the aspect ratio of the image information transmitted from the external device to be set to an aspect ratio that fits the projection image by the projector.

Another aspect of the invention is directed to a method for controlling a projector including a communication unit which communicates with an external device and a projection unit which projects, on a projection surface, a projection image based on image information transmitted from the external device via the communication unit. The method includes: setting an aspect ratio of the projection image; causing the projection unit to project the projection image according to the set aspect ratio; causing the communication unit to transmit, to the external device, first information about a setting of an aspect ratio of the image information transmitted from the external device; and if the setting of the aspect ratio of the projection image is changed from a first aspect ratio to a second aspect ratio, causing the communication unit to transmit the first information based on the second aspect ratio, to the external device.

According to the aspect of the invention, the first information based on the aspect ratio of the projection image by the projector is transmitted to the external device. This configuration enables a function of the projector to change the aspect ratio or resolution of the image information received by the projector from the external device.

The invention can be implemented in various other forms than the projector and the method for controlling the projector. For example, the invention may be implemented as a program executed by a computer (or processor) to execute the method. The invention can also be implemented in the form of a recording medium on which the program is recorded, a server device which distributes the program, a transmission medium which transmits the program, a data signal which embodies the program in a carrier wave, or the like.

BRIEF DESCRIPTION OF THE DRAWINGS

The invention will be described with reference to the accompanying drawings, wherein like numbers reference like elements.

FIG. 3 shows a configuration example of aspect ratio data and EDID.

DESCRIPTION OF EXEMPLARY EMBODIMENTS

Configuration of Display System

Figure 1:
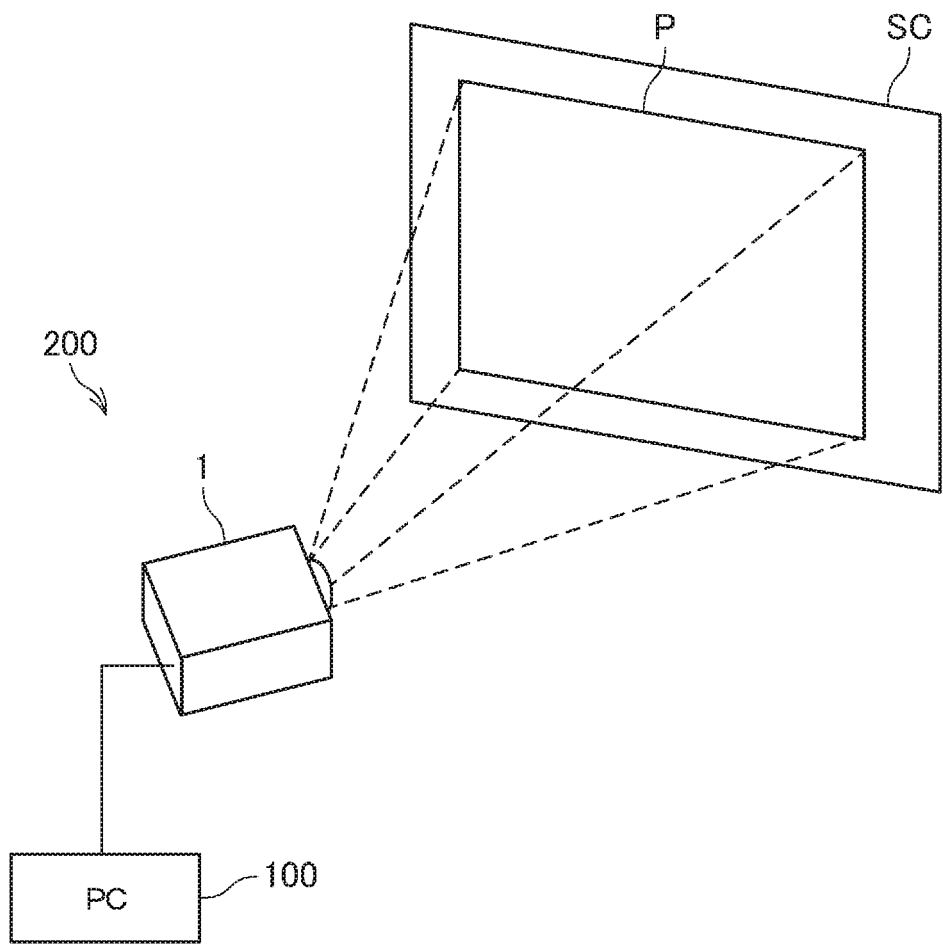
FIG. 1 shows a schematic configuration of a display system.

FIG. 1 shows a schematic configuration of a display system 200 according to an embodiment of the invention.

The display system 200 has a projector 1 as a display device, and a PC 100 connected as an external device to the projector 1. The PC 100 outputs image information D to the projector 1. The projector 1 projects a projection image P onto a screen SC, based on the image information D inputted from the PC 100. The projection of the projection image P by the projector 1 is an example of displaying an image by the display device.

The image information D outputted from the PC 100 may be an analog image signal or digital image data. The content of the image information D may be a still image or dynamic image and may include an audio signal or audio data.

The screen SC (projection surface) may be a curtain-like screen. Alternatively, a wall surface of a building or a flat surface of an installed object may be used as the screen SC. The screen SC is not limited to a flat surface and may be a curved surface or rugged surface.

The PC 100 is an example of an image supply device which outputs the image information D to the projector 1. The image supply device is a so-called image source. The image source is not limited to the PC 100 and may be any device that can be connected to the projector 1 and can output the image information D to the projector 1. For example, a disc-type medium playback device or television tuner device may be used as the image source.

Configuration of Projector

Figure 2:
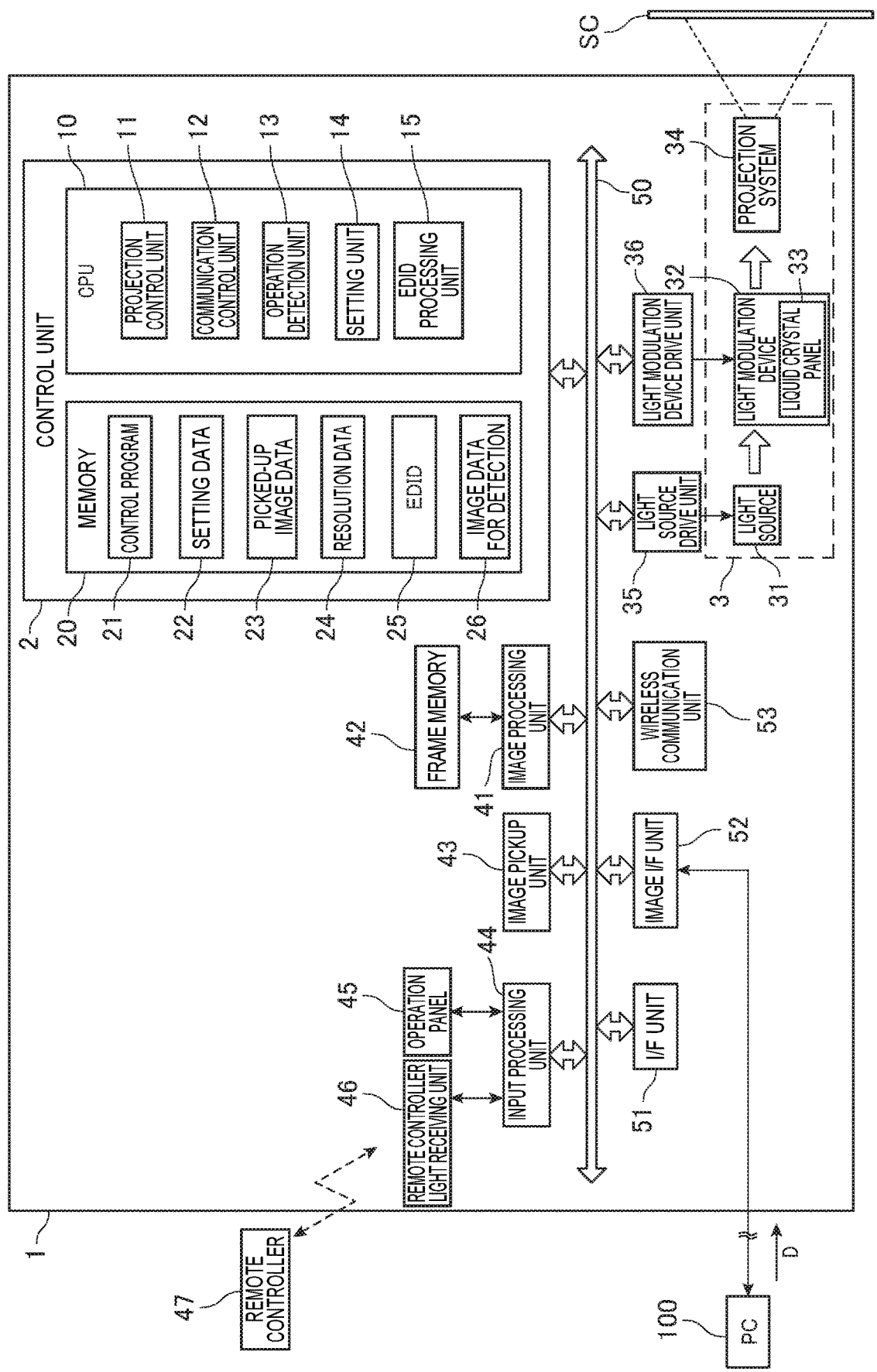
FIG. 2 is a block diagram of a projector.

FIG. 2 is a block diagram showing the configuration of the projector 1.

The projector 1 has a control unit 2 which controls each part of the projector 1, and a projection unit 3 which projects the projection image P. The control unit 2 is made up of a CPU 10 and a memory 20 or the like. The memory 20 is a storage device which stores a control program executed by the CPU 10 and data in a non-volatile manner. The memory 20 is made up of a semiconductor storage element such as a flash ROM. The memory 20 may include a RAM which forms a work area for the CPU 10.

The CPU 10 executes a control program 21 for the projector 1 stored in the memory 20 and thus functions as a projection control unit 11, a communication control unit 12, an operation detection unit 13, a setting unit 14, and an EDID processing unit 15. That is, these functional blocks are implemented by a collaboration of software and hardware as the CPU 10 executes the control program 21.

The memory 20 stores setting data 22, picked-up image data 23, resolution data 24, EDID (Extended Display Identification Data) 25, and image data for detection 26, in addition to the control program 21. The individual data stored in the memory 20 and the individual functions of the CPU 10 will be described later.

The projection unit 3 has a light source 31, a light modulation device 32, a liquid crystal panel 33, and a projection system 34. The light source 31 is made up of a lamp such as a halogen lamp, xenon lamp, or ultra-high-pressure mercury lamp, or a solid-state light source such as an LED or laser light source. The light source 31 turns on with electric power supplied from a light source drive unit 35 and emits light toward the light modulation device 32.

The light source drive unit 35 supplies a drive current or pulse to the light source 31 under the control of the control unit 2 and causes the light source 31 to emit light.

The light modulation device 32 (modulation unit) has the liquid crystal panel 33 (image forming unit) which is driven by a light modulation device drive unit 36 and forms an image. The light modulation device 32 modulates the light emitted from the light source 31, via an image formed on the liquid crystal panel 33, and thus forms image light and projects the image light toward the projection system 34.

The liquid crystal panel 33 is, for example, a transmission-type liquid crystal panel which transmits the light emitted from the light source 31 but may be a reflection-type liquid crystal panel. The light modulation device 32 may use a digital mirror device (DMD) instead of the liquid crystal panel 33. The light modulation device 32 may have three liquid crystal panels 33 which modulate color lights of R (red), G (green), and B (blue), respectively.

The light modulation device drive unit 36 drives the liquid crystal panel 33 according to an image signal inputted from an image processing unit 41, described later, sets a gradation level for each pixel of the liquid crystal panel 33, and draws an image on a frame basis on the liquid crystal panel 33.

The projection system 34 has optical elements such as a lens, a mirror and the like. The projection system 34 causes the light modulated by the light modulation device 32 to form an image on the screen SC and thus projects a projection image P. The projection system 34 may also have a zoon lens and a zoom mechanism for moving the zoom lens and may be able to adjust the zoom magnification for the projection image P in response to an operation by the user or under the control of the control unit 2.

The projector 1 also has an image processing unit 41, a frame memory 42, an image pickup unit 43, an input processing unit 44, an operation panel 45, a remote controller light receiving unit 46, an interface unit 51, an image interface unit 52, and a wireless communication unit 53. These units are connected to the control unit 2 via a bus 50 in a way that enables communication.

The interface (I/F) unit 51, the image interface (I/F) unit 52, and the wireless communication unit 53 are interfaces connected to an external device. These units are equivalent to the communication unit in the invention and can be alternatively referred to as a connection unit.

The interface unit 51 is a wired interface for data communication and has a connector (not illustrated) and an interface circuit (not illustrated) or the like. The interface unit 51 is connected to an external device such as the PC 100 via a cable and transmits and receives digital image data and control data or the like to and from the external device, under the control of the control unit 2. As the interface unit 51, a LAN interface or USB interface can be employed.

The image interface unit 52 is an image input interface to which the image information D such as digital image data or analog image signal is inputted. The image interface unit 52 has a connector (not illustrated) and an interface circuit (not illustrated) or the like and is connected to an image supply device such as the PC 100. As the image interface unit 52, HDMI (trademark registered), DSub interface or the like can be employed. The image interface unit 52 not only has the image information D inputted thereto but also may be able to transmit and receive control data. For example, the image interface unit 52 may have a channel on which digital image data is inputted and a channel on which control data is transmitted and received.

In this embodiment, the PC 100 is connected to the image interface unit 52 via a cable. The control unit 2 receives digital image data outputted from the PC 100, via the image interface unit 52. The control unit 2 also transmits and receives control data to and from the PC 100 via the image interface unit 52.

The wireless communication unit 53 has an antenna and an RF circuit (not illustrated) or the like and executes wireless data communication with an external device, under the control of the control unit 2. The wireless communication unit 53 executes wireless communication such as wireless LAN (including Wi-Fi (trademark registered)) or Bluetooth (trademark registered).

To the light modulation device drive unit 36, an image signal of an image to be drawn on the light modulation device 32 is inputted from the image processing unit 41. The light modulation device drive unit 36 drives the light modulation device 32, based on the image signal outputted from the image processing unit 41.

The image processing unit 41 is connected to the frame memory 42. The image processing unit 41 loads an image based on the image information D received from the interface unit 51, the image interface unit 52 or the wireless communication unit 53, onto the frame memory 42. The image processing unit 41 executes various kinds of image processing on the image loaded on the frame memory 42. For example, the image processing unit 41 executes resolution conversion processing to convert the resolution of image data according to a set resolution. The image processing unit 41 also executes geometric correction processing to correct the shape of image data and thus correct, for example, a keystone distortion. The image processing unit 41 may also execute color tone correction processing to correct the color tone of an image.

The image processing unit 41 generates an image signal to display the image loaded on the frame memory 42, and outputs the image signal to the light modulation device drive unit 36.

The image pickup unit 43 is a digital camera which carries out image pickup under the control of the control unit 2 and outputs picked-up image data. The image pickup range of the image pickup unit 43 in this embodiment includes the screen SC.

The input processing unit 44 (operation unit) is connected to the operation panel 45 and the remote controller light receiving unit 46. When the operation panel 45 or the remote controller light receiving unit 46 accepts an operation, the input processing unit 44 generates operation data corresponding to the accepted operation and outputs the operation data to the control unit 2.

The operation panel 45 is provided on the casing of the projector 1 and has various switches which the user can operate. The input processing unit 44 detects an operation of each switch on the operation panel 45.

The remote controller light receiving unit 46 receives an infrared signal transmitted from a remote controller 47. The input processing unit 44 decodes the signal received by the remote controller light receiving unit 46, generates operation data, and outputs the operation data to the control unit 2.

The setting data 22 stored in the memory 20 includes a set value about an operation of the projector 1. The set value included in the setting data 22 is, for example, a processing content executed by the image processing unit 41, a parameter used for the processing by the image processing unit 41, or the like.

The picked-up image data 23 is picked-up image data outputted from the image pickup unit 43.

The resolution data 24 is data including information that designates the aspect ratio of the image information D handled by the projector 1. The projector 1 can process the image information D of the aspect ratio designated by the resolution data 24 and project the projection image P. Since the aspect ratio can be univocally found from the resolution, the resolution data 24 may include information that designates either resolution or aspect ratio. The resolution data 24 may include both of resolution and aspect ratio. The aspect ratio and resolution can be collectively referred to as image form. The aspect ratio of the image information D handled by the projector 1 is not limited to the aspect ratio coincident with that of the liquid crystal panel 33 and may be an aspect ratio that is different from that of the liquid crystal panel 33. Thus, the resolution data 24 may include a plurality of aspect ratios.

In the description of this embodiment, resolution refers to so-called screen resolution. The resolution of an image such as the projection image P refers to the number of pixels forming the image. The resolution of an analog image signal refers to the number of scanning lines in the vertical direction and the number of pixels in the horizontal direction. The resolution of image data refers to the numbers of pixels in the directions of height and width of the image. The resolution of the liquid crystal panel 33 refers to the numbers of pixels in the directions of height and width that can form an image and that are used to generate image light, of the pixels provided in the liquid crystal panel 33. The aspect ratio refers to the ratio of the number of pixels or dots in the direction of width to the number of pixels or dots in the direction of height.

The EDID 25 (first information) is data transmitted from the projector 1 to the PC 100. The EDID 25 includes information representing at least one of the resolution and aspect ratio of the image information D handled by the projector 1. The EDID is a data format standardized by the VESA (Video Electronics Standards Association). More specifically, the EDID is a format of data transmitted on the DDC (Display Data Channel). The EDID format has a "standard timings supported" item that can set information representing the screen resolution or the like and/or aspect ratio of the display device. In other words, the EDID 25 is data in which the information designating the aspect ratio included in the resolution data 24 is set as the "standard timings supported" item of the EDID.

The projector 1 transmits the EDID 25 to the PC 100 via the interface unit 51, the image interface unit 52, or the wireless communication unit 53. The PC 100 decides the aspect ratio and resolution of the image information D to be outputted to the projector 1, based on the EDID 25.

The image data for detection 26 is data for projecting an image for detection, in the processing by the control unit 2 to detect the aspect ratio of the screen SC. The image data for detection 26 may be image data of an image for detection or may be a template or a function for arithmetic processing or the like to generate an image for detection. For example, the image for detection is an image including an optical detectable symbol such as a sign, mark, or image code. In this case, an image of the screen SC is picked up in the state where the image for detection is projected as the projection image P on the screen SC, and the control unit 2 analyzes picked-up image data. Thus, symbol can be detected from the picked-up image data.

The projector 1 may temporarily store, in the memory 20, the image information D received from the image supply device via the interface unit 51, the image interface unit 52 or the wireless communication unit 53.

The projection control unit 11 controls the light source drive unit 35 and the light modulation device drive unit 36 and thus causes the projection image P to be projected according to the image signal outputted form the image processing unit 41.

The projection control unit 11 also controls the image processing unit 41 to load an image onto the frame memory 42, based on the image information D. The projection control unit 11 causes the image processing unit 41 to execute various kinds of processing including resolution conversion processing and geometric correction processing.

The communication control unit 12 executes data communication with the external device connected to the interface unit 51, the image interface unit 52, and the wireless communication unit 53. When the image information D is inputted from the external device, the communication control unit 12 causes the image processing unit 41 to process the inputted image information D. The communication control unit 12 also transmits the EDID 25 to the external device.

The operation detection unit 13 detects an operation on the operation panel 45 or the remote controller 47, based on the operation data inputted from the input processing unit 44.

The setting unit 14 sets an aspect ratio that is set for the EDID 25. The setting unit 14 selects and sets an appropriate aspect ratio, as the aspect ratio of the image information D inputted from the PC 100, based on the operation detected by the operation detection unit 13 or the picked-up image data from the image pickup unit 43. The setting unit 14 generates the resolution data 24 or updates the resolution data 24, based on the set aspect ratio.

The EDID processing unit 15 edits the EDID 25 to include the aspect ratio of the resolution data 24 set by the setting unit 14. The EDID processing unit 15 causes the interface unit 51, the image interface unit 52, or the wireless communication unit 53 to transmit the edited EDID 25.

Aspect Ratios of Projection Image and Screen

Figure 4:
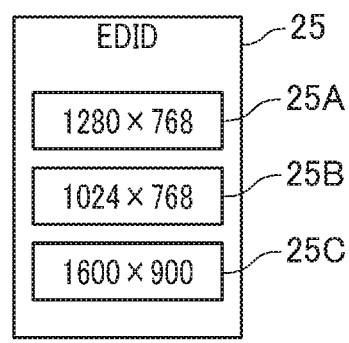
FIG. 4 shows a configuration example of aspect ratio data and EDID.

FIGS. 3 and 4 show a configuration example of the resolution data 24 and the EDID 25.

FIG. 3 shows a configuration example of the resolution data 24. FIG. 4 shows a configuration example of the EDID 25. The resolution data 24 in FIG. 3 includes information designating the resolution or aspect ratio of the projection image P with respect to a candidate of a display mode executable by the projector 1. This resolution data 24 is an example in the case where the liquid crystal panel 33 is made up of 1280 dots by 768 dots and where the projector 1 can project the projection image P in the three display modes of WXGA, XGA, and HD+.

The WXGA mode is a display mode in which the projection image P is projected with a resolution of 1280 dots by 768 dots. In the WXGA mode, the resolution of the projection image P coincides with the resolution of the liquid crystal panel 33. The aspect ratio of the projection image P is width:height=5:3, which is the same as the aspect ratio of the liquid crystal panel 33.

The WXGA mode is executed if the resolution of the image information D is 1280 dots by 768 dots. If the aspect ratio of the image information D is width:height=5:3 and the resolution of the image information D is not 1280 dots by 768 dots, the projector 1 executes the WXGA mode and causes the image processing unit 41 to execute resolution conversion processing on the image information D. In this case, the image processing unit 41 carries out resolution conversion processing, maintaining the aspect ratio of the image information D.

The XGA mode is a display mode in which the projection image P is projected with a resolution of 1024 dots by 768 dots. The XGA mode is executed by the projector 1 if the resolution of the image information D is 1024 dots by 768 dots and if the aspect ratio of the image information D is width:height=4:3. If the aspect ratio of the image information D is width:height=4:3 and the resolution is not 1024 dots by 768 dots, the image processing unit 41 carries out resolution conversion processing.

The HD+ mode is a display mode in which the projection image P is projected with a resolution of 1600 dots by 900 dots. The HD+ mode is also called WXGA++ mode. The HD+ mode is executed by the projector 1 if the resolution of the image information D is 1600 dots by 900 dots and if the aspect ratio of the image information D is width:height=16:9. If the aspect ratio of the image information D is width:height=16:9 and the resolution is not 1600 dots by 900 dots, the image processing unit 41 carries out resolution conversion processing.

The display mode executable by the projector 1 is not limited to the example in FIG. 3. For example, the projector 1 may be able to execute a display mode with a resolution of 1280 by 800 dots, 1366 by 768 dots or the like. The display modes may be differentiated from each other, based on the refresh rate (also referred to as vertical synchronization frequency) of the image information D. In this case, the resolution data 24 may include a plurality of display modes with the same screen resolution and different refresh rates.

In each of the display modes shown in FIG. 3, the image processing unit 41 can carry out geometric correction processing on the image drawn on the frame memory 42. The geometric correction processing by the image processing unit 41 can change the number of pixels of the image drawn on the frame memory 42. For example, the projection image P to be projected on the screen SC in the WXGA mode is not necessarily an image of 1280 dots by 768 dots on the frame memory 42. In other words, the WXGA mode is a display mode in which the image processing unit 41 processes the image information D to form an image of 1280 dots by 768 dots. The same applies to the XGA mode, the HD+ mode, and other display modes.

FIG. 4 shows an example of the EDID 25 prepared based on the resolution data 24 in FIG. 3. The EDID 25 includes a candidate of the resolution and/or aspect ratio of the image information D that can be processed by the projector 1. The EDID 25 in the example in FIG. 4 includes candidates 25A, 25B, 25C. In this case, if image information D corresponding to one of the candidates 25A, 25B, 25C is inputted, the projector 1 can project the projection image P based on this image information D. The EDID 25 may include information designating at least one of resolution and aspect ratio and may also include information designating a refresh rate.

The aspect ratio or resolution of the image information D outputted from the PC 100 is decided based on the hardware configuration and software specifications of the PC 100. Usually, an aspect ratio or resolution can be selected from among several candidates. The PC 100 selects a candidate that coincides with a resolution and/or aspect ratio that can be outputted from the PC 100, from among the candidates 25A, 25B, 25C of the EDID 25 received from the projector 1, and outputs the image information D with the same resolution and/or aspect ratio as the selected candidate.

The order in which the candidates 25A, 25B, 25C are arranged in the EDID 25 represents the levels of priority of the candidates 25A, 25B, 25C. In the example in FIG. 4, the candidates 25A, 25B, 25C are selected in order from the top. If the candidates 25A, 25B, 25C included in the EDID 25 includes a plurality of candidates that coincide with a resolution and/or aspect ratio that can be outputted from the PC 100, the PC 100 selects a candidate with the highest level of priority.

Figure 5:
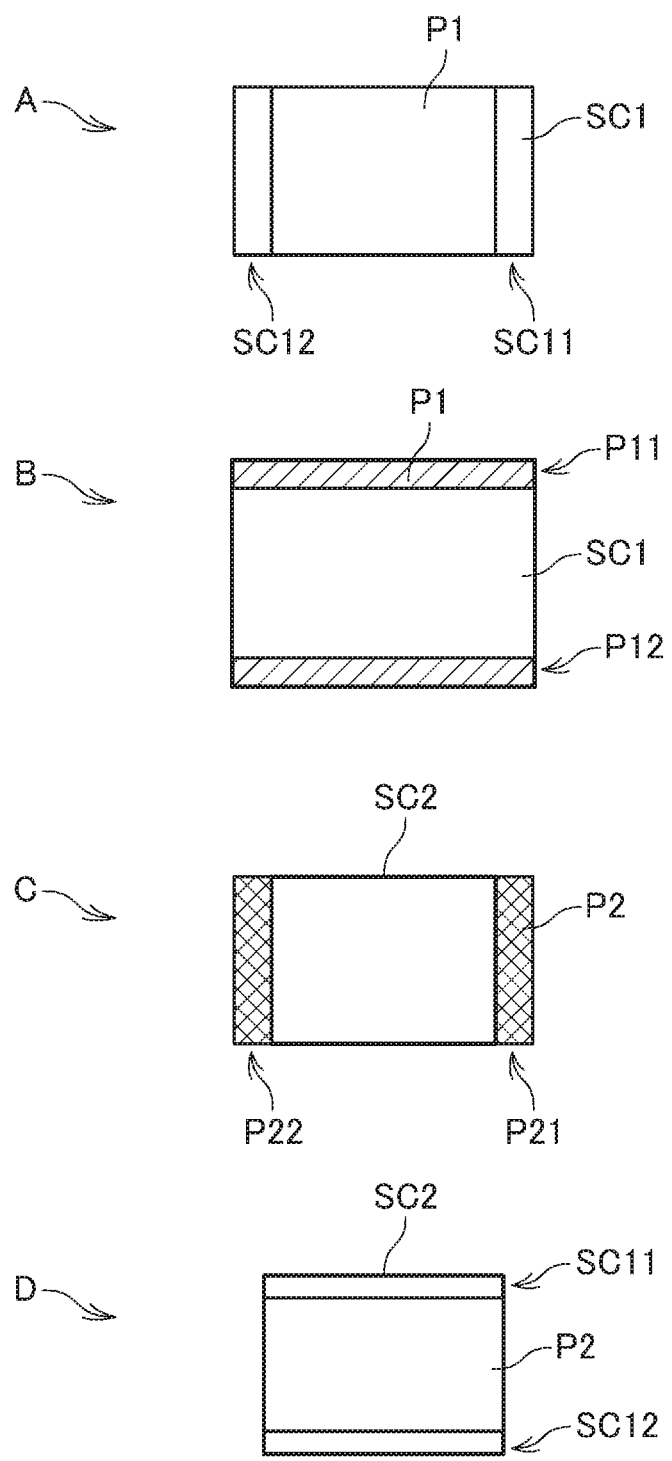
FIG. 5 shows examples of correspondence between aspect ratios of projection image and screen.

FIG. 5 shows examples of correspondence between the aspect ratios of the projection image P and the screen SC.

FIG. 5 shows examples in which a projection image P1 with an aspect ratio of width:height=4:3 and a projection image P2 with an aspect ratio of width:height=16:9 are projected, using a screen SC1 with an aspect ratio of width:height=16:9 and a screen SC2 with an aspect ratio of width:height=4:3.

In the examples indicated by A, B in FIG. 5, the projection image P1 is projected on the screen SC1.

In the example A, the projection image P1 fits within the screen SC1. While the screen SC1 has non-projection areas SC11, SC12 where the projection image P1 is not projected, the projection image P1 is visible enough.

However, in the example B, the projection image P1 fits in the screen SC1 in the direction of width but extends beyond the screen SC1 in the direction of height. The images in extended areas P11, P12 are out of the screen SC1 and therefore less visible.

In an example C, the projection image P2 extends beyond the screen SC2 in the direction of width. Therefore, the images of the projection image P in extended areas P21, P22 are less visible.

In an example D, the projection image P2 fits within the screen SC2. Therefore, the entirety of the projection image P2 is visible enough.

In the examples A to D in FIG. 5, the aspect ratios of the screens SC1, SC2 and the aspect ratios of the projection images P1, P2 do not coincide with each other. However, in the examples A, D, the entirety of the projection images P1, P2 is visible enough on the screens SC1, SC2. Therefore, in these examples, the aspect ratios of the projection images P1, P2 are appropriate to the screens SC1, SC2.

If the image processing unit 41 carries out image processing in such a way as to maintain the aspect ratio of the image information D and then draws an image on the frame memory 42, the aspect ratio of the projection image P depends on the aspect ratio of the image information D. Thus, the projector 1 transmits the EDID 25 to the PC 100 so that the image information D that fits the aspect ratio of the screen SC is inputted from the PC 100. This operation will now be described.

Operations of Display System

Figure 6:
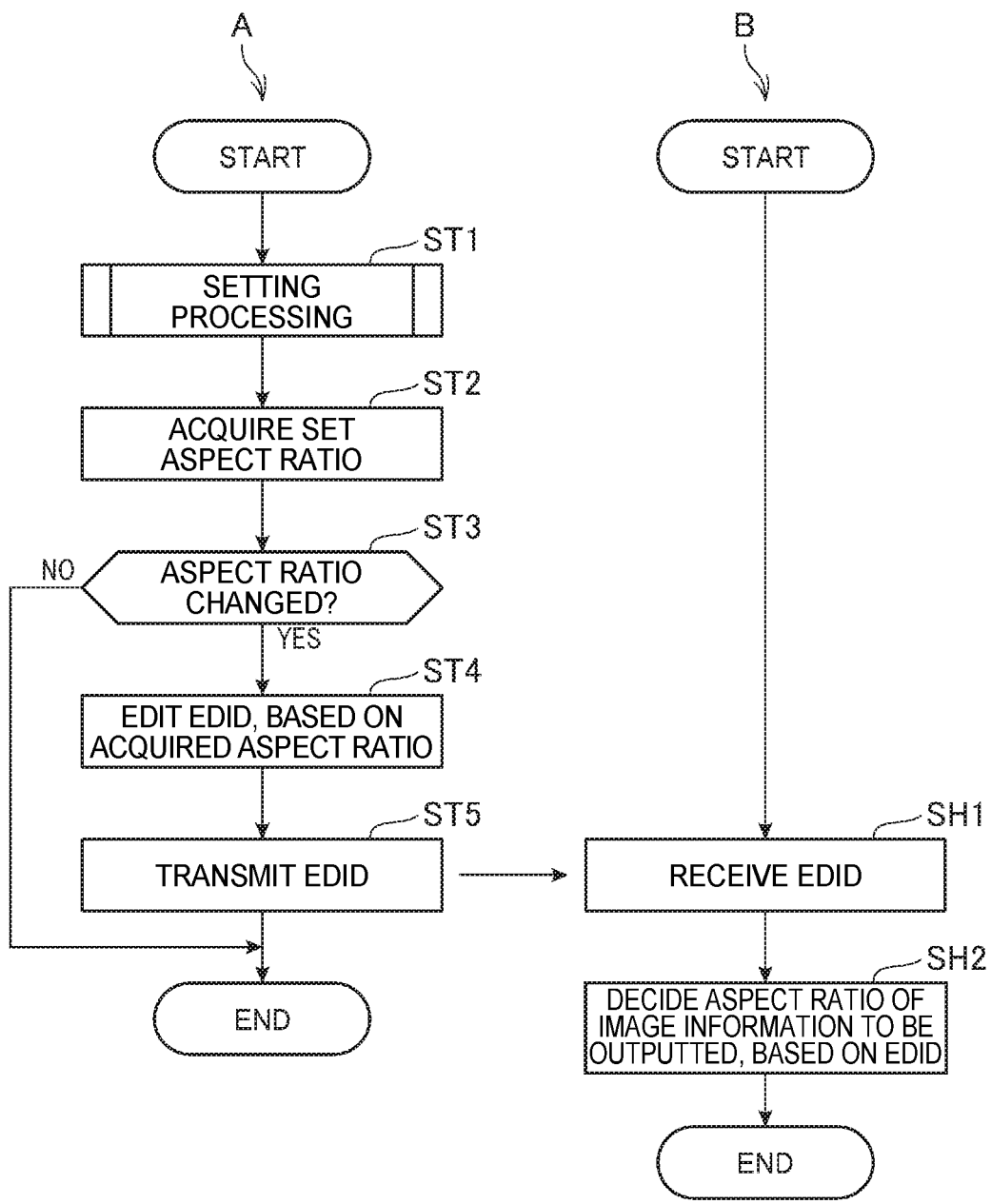
FIG. 6 is a flowchart showing operations of the display system.

FIG. 6 is a flowchart showing operations of the display system 200. In FIG. 6, A represents operation of the projector 1 and B represents operations of the PC 100.

The control unit 2 of the projector 1 executes setting processing (step ST1). The setting processing of step ST1 is the processing of setting an aspect ratio of the projection image P that fits the screen SC. Details of step ST1 will be described with reference to FIGS. 7 and 8.

In the operations described below, the setting unit 14 functions as a setting unit and a detection unit, and the EDID processing unit 15 functions as a control unit.

Setting of Aspect Ratio

Figure 7:
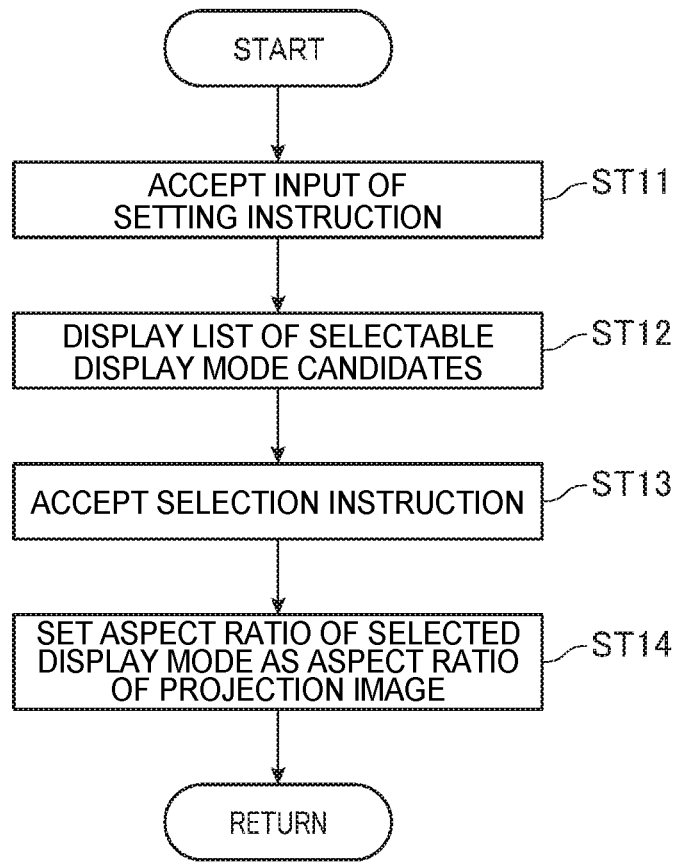
FIG. 7 is a flowchart showing operations of the projector.

FIG. 7 is a flowchart showing operations of the projector 1. FIG. 7 shows details of the setting processing of step ST1 in FIG. 6. The setting processing in FIG. 7 is an operation example in the case of setting an aspect ratio according to an operation by the user detected by the input processing unit 44.

The setting unit 14 analyzes operation data inputted from the input processing unit 44 and accepts an input of an instruction about the setting of an aspect ratio (step ST11). The setting unit 14 causes the projection unit 3 to project an image showing a list of candidates of the aspect ratio of the projection image P onto the screen SC (step ST12). In step ST12, for example, an image showing a list of display modes included in the resolution data 24 may be projected by the projection unit 3.

At this point, the user operates the operation panel 45 or the remote controller 47 and carries out an operation to select an aspect ratio that fits the screen SC.

The setting unit 14 analyzes operation data inputted from the input processing unit 44 and accepts an input of an instruction to select a candidate projected on the screen SC (step ST13). The setting unit 14 sets the aspect ratio selected by the accepted input, as the aspect ratio of the projection image P (step ST14).

In step ST14, the one aspect ratio selected by the user is set.

In the setting processing in FIG. 7, the projector 1 may change the aspect ratio of the projection image P. For example, if the setting unit 14 accepts an operation to select an aspect ratio from a list of aspect ratio candidates in step ST13, the setting unit 14 may cause the projection unit 3 to project the projection image P with the selected aspect ratio. Also, if the user selects an aspect ratio, an operation to finalize the aspect ratio may be requested, and an aspect ratio may be able to be selected repeatedly before the operation to finalize the aspect ratio. In this case, every time the user selects an aspect ratio, the projection image P is projected with the selected aspect ratio. Therefore, the user can select and finalize an appropriate aspect ratio while visually checking whether the aspect ratio of the projection image P corresponds to the screen SC or not.

Figure 8:
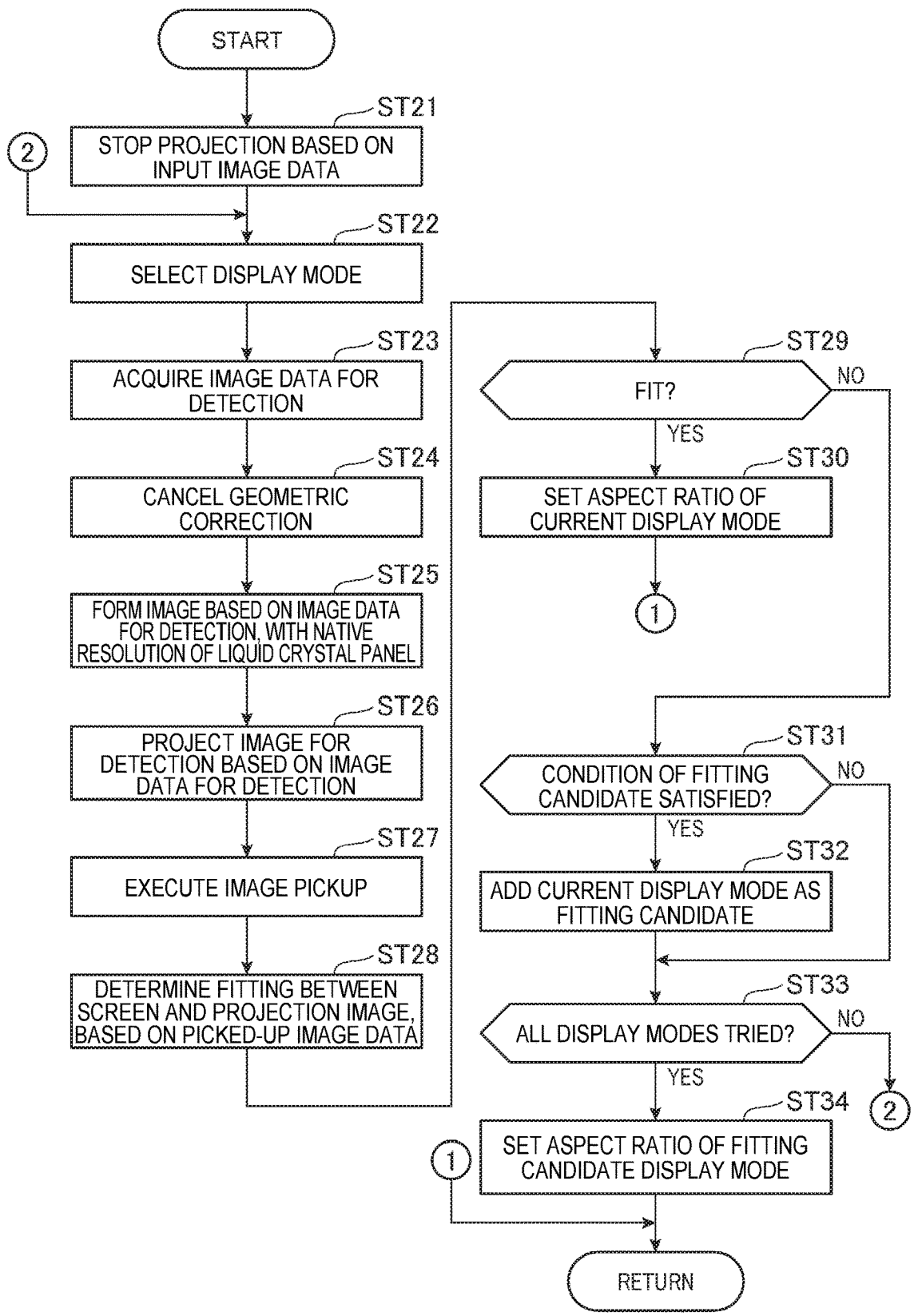
FIG. 8 is a flowchart showing operations of the projector.

FIG. 8 is a flowchart showing operations of the projector 1. FIG. 8 shows details of the setting processing of step ST1 in FIG. 6. The setting processing in FIG. 8 is an operation example in the case of automatically setting an aspect ratio, using picked-up image data from the image pickup unit 43.

The setting processing in FIG. 8 is executed instead of the setting processing in FIG. 7. For example, whether to carry out the setting processing in FIG. 7 or the setting processing in FIG. 8 may be selected before starting step ST1 in FIG. 6.

As the setting processing in FIG. 8 starts, the setting unit 14 stops the projection of the projection image P based on the image information D (step ST21). After the projection is stopped in step ST21, for example, a blank projection image P, an entirely blue projection image P for maintenance, or a projection image P entirely made up of black pixels, or the like, may be displayed.

Next, the setting unit 14 selects one of the display modes included in the resolution data 24 (step ST22). In step ST22, the setting unit 14 selects, for example, a plurality of display modes included in the resolution data 24 according to a preset order of priority.

The setting unit 14 acquires the image data for detection 26 (step ST23). The setting unit 14 cancels the geometric correction by the image processing unit 41 (step ST24). In step ST24, the form of geometric correction or the parameter for geometric correction set by the image processing unit 41 is initialized, resulting in the state where the image processing unit 41 does not carry out geometric correction. The form of geometric correction refers to the processing content of geometric correction such as keystone correction or barrel distortion correction.

The setting unit 14 causes the image processing unit 41 to form an image for detection on the frame memory 42, based on the image data for detection 26 acquired in step ST22 (step ST25). In step ST25, the image processing unit 41 forms an image with the maximum resolution of the liquid crystal panel 33, on the frame memory 42. The maximum resolution of the liquid crystal panel 33 refers to the resolution or the number of pixels in the case where the entirety of a modulation area to form the projection image P is used, of the area where pixels area arranged in the liquid crystal panel 33. The maximum resolution can also be referred to as native resolution.

The setting unit 14 causes the projection unit 3 to project the image for detection formed on the frame memory 42 in step ST25 (step ST26). The setting unit 14 causes the image pickup unit 43 to pick up an image of the screen SC (step ST27). In step ST27, the projector 1 picks up an image of the screen SC in the state where the image for detection is projected as the projection image P on the screen SC.

The setting unit 14 carries out processing such as detecting the symbol from the picked-up image data from the image pickup unit 43 and determines the fitting state of the aspect ratios of the screen SC and the projection image P (step ST28). For example, the setting unit 14 detects the edge of the screen SC from the picked-up image data and detects the position of the four corners of the image for detection projected as the projection image P. In this case, the setting unit 14 determines whether the four corners of the image for detection are within the edge of the screen SC or not. If the four corners of the image for detection are within a predetermined distance from the edge of the screen SC, the setting unit 14 determines that the aspect ratios fit each other.

The setting unit 14 determines the fitting state of the aspect ratios (step ST29). If the setting unit 14 determines that the aspect ratios fit each other (YES in step ST29), the setting unit 14 set the aspect ratio of the display mode selected in step ST22, as the aspect ratio of the projection image P (step ST30). The control unit 2 then returns to the processing in FIG. 6.

If the setting unit 14 determines that the aspect ratios do not fit each other (NO in step ST29), the setting unit 14 determines whether the fitting state of the aspect ratios of the screen SC and the projection image P satisfies a condition of fitting candidate or not (step ST31). In step ST31, for example, the setting unit 14 determines that the aspect ratios fit each other if the four corners of the image for detection are situated to the inner side of the edge of the screen SC. In this example, the state where the image for detection does not extend beyond the screen SC, that is, an aspect ratio such that the projection image P does not extend beyond the screen SC, is employed as a condition of fitting candidate. For example, the examples A and D in FIG. 5 are cases in point.

If the fitting state of the aspect ratios of the screen SC and the projection image P satisfies the condition of fitting candidate (YES in step ST31), the setting unit 14 temporarily stores the aspect ratio of the display mode selected in step ST22, as a fitting candidate (step ST32). If a fitting candidate is already stored, an aspect ratio that is a new fitting candidate is additionally stored in step ST32. After storing the fitting candidate aspect ratio, the setting unit 14 shifts to step ST33. Meanwhile, if the fitting state of the aspect ratios of the screen SC and the projection image P does not satisfy the condition of fitting candidate (NO in step ST31), the setting unit 14 shifts to step ST33.

In step ST33, the setting unit 14 determines whether steps ST22 to ST31 have been tried on all the display modes of the resolution data 24 or not (step ST33). If these steps have not been tried on any of the display modes (NO in step S33), the setting unit 14 returns to step ST22 and selects another display mode.

Meanwhile, if these steps have been tried on all the display modes (YES in step ST33), the setting unit 14 sets the aspect ratio stored as a fitting candidate, as the aspect ratio of the projection image P (step ST34), and then returns to the processing in FIG. 6. In step ST34, if there is a plurality of aspect ratios stored as fitting candidates, the setting unit 14 selects an aspect ratio from among the plurality of aspect ratios, based on a preset criterion. For example, the setting unit 14 selects an aspect ratio corresponding to a high-resolution display mode included in the resolution data 24, from among the fitting candidates, as the aspect ratio of the projection image P. In this case, the resolution of the image information D can be made higher.

Back to FIG. 6, the control unit 2 causes the EDID processing unit 15 to acquire the aspect ratio set by the setting processing in step ST1 (step ST2), and determines whether the currently set aspect ratio has been changed or not (step ST3). For example, if the projector 1 executes the operations of steps ST1 to ST5 and then executes the operation of step ST1 again, the EDID processing unit 15 compares the set aspect ratio with the aspect ratio set in step ST1. If the aspect ratio has been changed, the aspect ratio before change is equivalent to the first aspect ratio according to the invention and the aspect ratio after change acquired in step ST2 is equivalent to the second aspect ratio according to the invention.

If the control unit 2 determines that the aspect ratio has not been changed (NO in step ST3), the control unit 2 ends this processing.

If the control unit 2 determines that the aspect ratio has been changed (YES in step ST3), the EDID processing unit 15 carries out processing to edit the EDID 25, based on the aspect ratio acquired in step ST2 (step ST4).

Editing of EDID

In step ST4, the EDID processing unit 15 edits the EDID 25 to include the aspect ratio of the projection image P set in step ST1. As specific forms of this processing, the following examples (1) and (2) may be employed.

(1) The EDID processing unit 15 edits the EDID 25 to form data including a plurality of aspect ratio candidates and information designating the levels of priority of each candidate. In this case, the EDID 25 may include the aspect ratio set in step ST1, as a candidate, and may include other aspect ratios as candidates. The level of priority of each aspect ratio in the EDID 25 corresponds to, for example, the order in which the aspect ratios are described in the EDID 25. The EDID processing unit 15 edits the EDID 25 in such a way that the aspect ratio set in step ST1 has a higher level of priority than the other candidates. In the example in FIG. 4, the EDID processing unit 15 edits the EDID 25 in such a way that the aspect ratio set in step ST1 is the candidate 25A with the highest level of priority.

The EDID 25 may include data designating the level of priority of each candidate. In this case, the EDID processing unit 15 edits the data designating the level of priority of each candidate, in step ST4.

(2) The EDID processing unit 15 edits the EDID 25 to include the aspect ratio set in step ST1 and to have a smaller number of candidates than before the processing in step ST4.

The EDID processing unit 15 may carry out both of the processing (1) and (2) or may carry out one of them. The EDID processing unit 15 may also edit the EDID 25 to form data including the aspect ratio stored as a fitting candidate in step ST32 (FIG. 8), in the processing (1) and (2).

The EDID processing unit 15 transmits the EDID 25 edited in step ST4 to the PC 100 (step ST5). The EDID 25 edited in step ST4 may be automatically transmitted to the PC 100 in step ST5 after being edited, or may be transmitted in response to the interface unit 51 or the like receiving a transmission request from the PC 100.

The PC 100 receives the EDID 25 transmitted from the projector 1 (step SH1) and decides the aspect ratio of the image information D, based on the received EDID 25 (step SH2). For example, the PC 100 selects the fitting candidate of the aspect ratio of the image information D that can be outputted from the PC 100, from among the aspect ratio candidates included in the EDID 25, in order from the highest level of priority in the EDID 25, as described with reference to FIG. 4. If the EDID 25 includes a candidate of information designating a resolution, the PC 100 selects a resolution of the image information D in step SH2. The PC 100 outputs the image information D with the resolution or aspect ratio decided in step ST2.

As described above, the projector 1 according to an embodiment of the invention has the communication unit, which communicates with the PC 100. The projector 1 has the projection unit 3, which projects, on the screen SC, the projection image P based on the image information D transmitted to the projector 1 from the PC 100 via the communication unit. The projector 1 also has the setting unit 14, which sets an aspect ratio for the projection image P, and the projection control unit 11, which causes the projection unit 3 to project the projection image P according to the aspect ratio set by the setting unit 14. The projector 1 has the EDID processing unit 15, which causes the communication unit to transmit, to the PC 100, the EDID 25 about the aspect ratio of the image information D transmitted from the PC 100. If the setting unit 14 changes the aspect ratio of the projection image P from the first aspect ratio to the second aspect ratio, the EDID processing unit 15 causes the communication unit to transmit the EDID 25 based on the second aspect ratio, to the PC 100. The communication unit may be able to be selected from among the interface unit 51, the image interface unit 52, and the wireless communication unit 53. In this embodiment, the communication unit is the image interface unit 52.

The projector 1, to which the display device and the method for controlling the display device according to the invention are applied, transmits the EDID 25 based on the aspect ratio of the projection image P by the projector 1, to the PC 100. Therefore, the aspect ratio or resolution of the image information D received by the projector 1 from the PC 100 can be changed by a function of the projector 1.

The EDID 25 is information including the aspect ratio of the image information D transmitted from the PC 100. Thus, the aspect ratio or resolution of the image information D transmitted from the PC 100 to the projector 1 can be designated by a function of the projector 1.

The projector 1 has the input processing unit 44, which accepts an operation. The setting unit 14 sets the aspect ratio of the projection image P, based on the aspect ratio designated by the operation accepted by the input processing unit 44. Thus, the image information D corresponding to the aspect ratio or resolution set by a user's operation can be transmitted from the PC 100 to the projector 1.

The setting unit 14 also functions as a detection unit which detects an aspect ratio that fits the screen SC. The setting unit 14 sets the aspect ratio of the projection image P, based on the result of the detection. Thus, the aspect ratio of the projection image P can be easily set.

The setting unit 14, in the setting processing, selects an aspect ratio that fits the screen SC, from among candidates of the aspect ratio of the projection image P that can be projected by the projector unit 3. If the aspect ratio candidates do not include an aspect ratio that fits the screen SC, the setting unit 14 selects an aspect ratio such that the projection image P does not extend beyond the screen SC. Thus, an aspect ratio for the projection image P can be selected and set from among candidates even if the candidates do not include an aspect ratio that fits the screen SC.

The projector 1 has the image pickup unit 43, which picks up an image of the screen SC. The setting unit 14, in the setting processing, selects an aspect ratio that fits the screen SC, based on a picked-up image by the image pickup unit 43. Thus, the aspect ratio of the projection image P can be easily set, based on the picked-up image of the screen SC.

In the projector 1, when the image pickup unit 43 picks up an image of the screen SC, the projection unit 3 stops projecting the projection image P based on the image information D transmitted to the projector 1 from the PC 100 via the communication unit. Thus, the shape, aspect ratio and the like of the screen SC can be detected properly.

The projection unit 3 has the light source 31, and the light modulation device 32, which has the liquid crystal panel 33 for forming an image and which modulates the light emitted from the light source 31, via an image formed by the liquid crystal panel 33. When the image pickup unit 43 picks up an image of the screen SC, the projection unit 3 projects an image for detection with the screen resolution of the liquid crystal panel 33, that is, the native resolution. Thus, the fitting state between the liquid crystal panel 33 of the projection unit 3 and the screen SC can be detected accurately.

The projector 1 has the image processing unit 41, which carries out geometric correction of the image formed on the liquid crystal panel 33. When the image pickup unit 43 picks up an image of the screen SC, the geometric correction by the image processing unit 41 is stopped. Thus, the fitting state between the liquid crystal panel 33 and the screen SC can be detected more accurately.

The EDID 25 includes a plurality of candidates of the aspect ratio of the image information D, and information designating the level of priority of each of the candidates. If the setting unit 14 changes the aspect ratio of the projection image P from the first aspect ratio to the second aspect ratio, the EDID processing unit 15 edits the EDID 25, based on the aspect ratio after change. The EDID processing unit 15 may edit the EDID 25 in such a way that the second aspect ratio is included as a candidate and that the second aspect ratio has a higher level of priority than the other aspect ratios. The EDID processing unit 15 causes the communication unit to transmit the edited EDID 25 to the PC 100. Thus, the aspect ratio of the image information D transmitted from the PC 100 can be set as an aspect ratio that fits the projection image P by the projector 1.

When editing the EDID 25, the EDID processing unit 15 may carry out processing on the EDID 25 to reduce the number of candidates included in the EDID 25 and to include the second aspect ratio in the EDID 25, and may cause the communication unit to transmit the EDID 25 after processing. Thus, the aspect ratio of the image information D transmitted from the PC 100 can be set as an aspect ratio that fits the projection image P by the projector 1.

The above embodiment is simply a specific example to which the invention is applied, and therefore should not limit the invention. The invention can be applied in other forms. For example, while the PC 100 is connected to the image interface unit 52 in the above embodiment, the interface unit 51 or the wireless communication unit 53 may function as a communication unit and communicate with the PC 100.

In the description of the embodiment, in the projector 1, the setting unit 14 sets an aspect ratio of the projection image P by the setting processing in FIGS. 7 and 8, and the EDID 25 is edited, based on the set aspect ratio. However, the aspect ratio can be found from the resolution. The invention can also be applied to an example in which the setting unit 14 sets a resolution of the projection image P. In this case, the setting unit 14 sets a resolution of the projection image P by the setting processing in FIGS. 7 and 8, and the EDID processing unit 15 edits the EDID 25, based on the resolution of the projection image P set by the setting unit 14. In this case, the EDID 25 may be data which does not include information directly designating an aspect ratio but includes information designating a resolution. Even in this case, the aspect ratio of the image information D can be controlled based on the aspect ratio of the projection image P, as in the above embodiment, and therefore similar effects can be achieved.

The display device according to the invention is not limited to the projector 1 projecting an image on the screen SC. For example, a liquid crystal display having a liquid crystal display panel may be employed. A display having, for example, a PDP (plasma display panel) or organic EL display panel, may also be employed. The invention can also be applied to various other display devices.

At least part of the functional blocks illustrated in the block diagram in the embodiment may be implemented by hardware or may be implemented by a collaboration of hardware and software. Therefore, the configuration of these functional blocks is not limited to a configuration in which independent hardware resources are arranged as shown in the block diagram. The program executed by the control unit may be stored in a storage unit or another storage device (not illustrated). Also, the control unit may acquire and execute the program stored in an external device. Moreover, the specific configuration of each of the other devices forming the display system 200 can be arbitrarily changed without departing from the spirit of the invention.

What is claimed is:
1. A projector comprising:
a communication unit which communicates with an external device;
a projection unit which projects, on a projection surface, a projection image based on image information transmitted to the projector from the external device via the communication unit;
a setting unit which sets an aspect ratio of the projection image;
a projection control unit which causes the projection unit to project the projection image according to the aspect ratio set by the setting unit; and
a control unit which causes the communication unit to transmit, to the external device, first information about an aspect ratio of the image information transmitted from the external device,
wherein if the setting unit changes the aspect ratio of the projection image from a first aspect ratio to a second aspect ratio, the control unit causes the communication unit to transmit the first information based on the second aspect ratio, to the external device.
2. The projector according to claim 1, wherein the first information includes the aspect ratio of the image information transmitted from the external device.

3. The projector according to claim 1, further comprising an operation unit which accepts an operation,
wherein the setting unit sets the aspect ratio of the projection image, based on an aspect ratio designated by an operation accepted by the operation unit.

4. The projector according to claim 1, further comprising a detection unit which detects an aspect ratio that fits the projection surface,
wherein the setting unit sets the aspect ratio of the projection image, based on a result of the detection by the detection unit.

5. The projector according to claim 4, wherein the detection unit selects an aspect ratio that fits the projection surface from among candidates of the aspect ratio of the projection image that can be projected by the projection unit, and if the candidates of the aspect ratio do not include the aspect ratio that fits the projection surface, the detection unit selects an aspect ratio such that the projection image does not extend beyond the projection surface, from among the candidates of the aspect ratio.

6. The projector according to claim 4, further comprising an image pickup unit which picks up an image of the projection surface,
wherein the detection unit selects an aspect ratio that fits the projection surface, based on a picked-up image by the image pickup unit.

7. The projector according to claim 6, wherein when the image pickup unit picks up an image of the projection surface, the projection unit stops projecting the projection image based on the image information transmitted to the projector from the external device via the communication unit.

8. The projector according to claim 7, wherein the projection unit has a light source, and a modulation unit which has an image forming unit for forming an image and which modulates light emitted from the light source, via an image formed by the image forming unit, and
when the image pickup unit picks up an image of the projection surface, the projection unit projects an image for detection with a screen resolution of the image forming unit.

9. The projector according to claim 8, further comprising an image processing unit which carries out geometric correction of the image formed by the image forming unit,
wherein when the image pickup unit picks up an image of the projection surface, the geometric correction by the image processing unit is stopped.

10. The projector according to claim 1, wherein the first information includes a plurality of candidates of the aspect ratio of the image information, and information designating a level of priority of each of the candidates, and
the control unit causes the communication unit to transmit the first information which include the second aspect ratio among the candidates and in which the level of priority of the second aspect ratio is higher than the levels of priority of the other aspect ratios.

11. The projector according to claim 1, wherein the first information includes a candidate of the aspect ratio of the image information, and
if the setting unit changes the aspect ratio of the projection image from the first aspect ratio to the second aspect ratio, the control unit carries out processing on the first information to reduce the number of the candidate included in the first information and to include the second aspect ratio, and causes the communication unit to transmit the first information after the processing.

12. A method for controlling a projector including a communication unit which communicates with an external device and a projection unit which projects, on a projection surface, a projection image based on image information transmitted from the external device via the communication unit, the method comprising:
setting an aspect ratio of the projection image;
causing the projection unit to project the projection image according to the set aspect ratio;
causing the communication unit to transmit, to the external device, first information about a setting of an aspect ratio of the image information transmitted from the external device; and
if the setting of the aspect ratio of the projection image is changed from a first aspect ratio to a second aspect ratio, causing the communication unit to transmit the first information based on the second aspect ratio, to the external device.

13. The method for controlling the projector according to claim 12, wherein the first information is information including the aspect ratio of the image information transmitted from the external device.

14. The method for controlling the projector according to claim 12, wherein if an operation to designate an aspect ratio is accepted, the aspect ratio of the projection image is set, based on the designated aspect ratio.

15. The method for controlling the projector according to claim 12, wherein an aspect ratio that fits the projection surface is detected, and
the aspect ratio of the projection image is set, based on a result of the detection.

16. The method for controlling the projector according to claim 15, wherein an aspect ratio that fits the projection surface is selected from among candidates of the aspect ratio of the projection image that can be projected by the projection unit, and if the candidates of the aspect ratio do not include the aspect ratio that fits the projection surface, an aspect ratio such that the projection image does not extend beyond the projection surface is selected from the candidates of the aspect ratio.

17. The method for controlling the projector according to claim 15, wherein an image of the projection surface is picked up to generate a picked-up image, and
an aspect ratio that fits the projection surface is selected, based on the picked-up image.

18. The method for controlling the projector according to claim 17, wherein when an image of the projection surface is picked up, the projection unit stops projecting the projection image based on the image information transmitted to the projector from the external device.

19. The method for controlling the projector according to claim 18, wherein the projection unit has a light source, and a modulation unit which has an image forming unit for forming an image and which modulates light emitted from the light source, via an image formed by the image forming unit, and
when an image of the projection surface is picked up, the projection unit projects an image for detection with a screen resolution of the image forming unit.

20. The method for controlling the projector according to claim 19, wherein when the projection image is projected on the projection surface, geometric correction of the image formed by the image forming unit is carried out, and
when an image of the projection surface is picked up, the geometric correction is stopped.

* * * * *